(12) United States Patent
Casden

(10) Patent No.: US 7,411,507 B2
(45) Date of Patent: Aug. 12, 2008

(54) METAL HOUSING WITH INTEGRAL ANTENNA FOR RFID READER/WRITER

(75) Inventor: Martin S. Casden, Calabasas, CA (US)

(73) Assignee: Soundcraft, Inc., Chatsworth, CA (US)

( * ) Notice: Subject to any disclaimer, the term of this patent is extended or adjusted under 35 U.S.C. 154(b) by 0 days.

(21) Appl. No.: 11/179,069

(22) Filed: Jul. 12, 2005

(65) Prior Publication Data

US 2006/0038686 A1 Feb. 23, 2006

Related U.S. Application Data

(60) Provisional application No. 60/603,511, filed on Aug. 20, 2004.

(51) Int. Cl.
*G08B 13/14* (2006.01)

(52) U.S. Cl. .............. 340/572.7; 340/10.1; 343/788; 343/872

(58) Field of Classification Search ............... 340/572.7
See application file for complete search history.

(56) References Cited

U.S. PATENT DOCUMENTS

| 5,859,587 | A | * | 1/1999 | Alicot et al. ............ 340/572.8 |
| 6,307,517 | B1 | * | 10/2001 | Lee ......................... 343/741 |
| 2005/0125093 | A1 | * | 6/2005 | Kikuchi et al. ............ 700/213 |
| 2005/0162331 | A1 | * | 7/2005 | Endo et al. ................ 343/788 |

FOREIGN PATENT DOCUMENTS

WO     WO 01/50423 A1     7/2001

* cited by examiner

*Primary Examiner*—George Bugg
(74) *Attorney, Agent, or Firm*—Law Offices of Natan Epstein

(57) ABSTRACT

Enhanced physical protection against vandalism for RFID reader/writer units is provided by a relatively thick metal front or housing which also functions as the antenna element of the reader/writer. The metal front is cut or slotted to define a radio frequency antenna integral with the metal front or housing for improved physical protection and good unshielded antenna function.

10 Claims, 2 Drawing Sheets

Single Turn Metal Antenna:
1 - Metal Housing acts as an Antenna
2 - Slit to create an antenna
3 - Circuit board connection to inject the signal
4 - Hard Annodized Aluminium

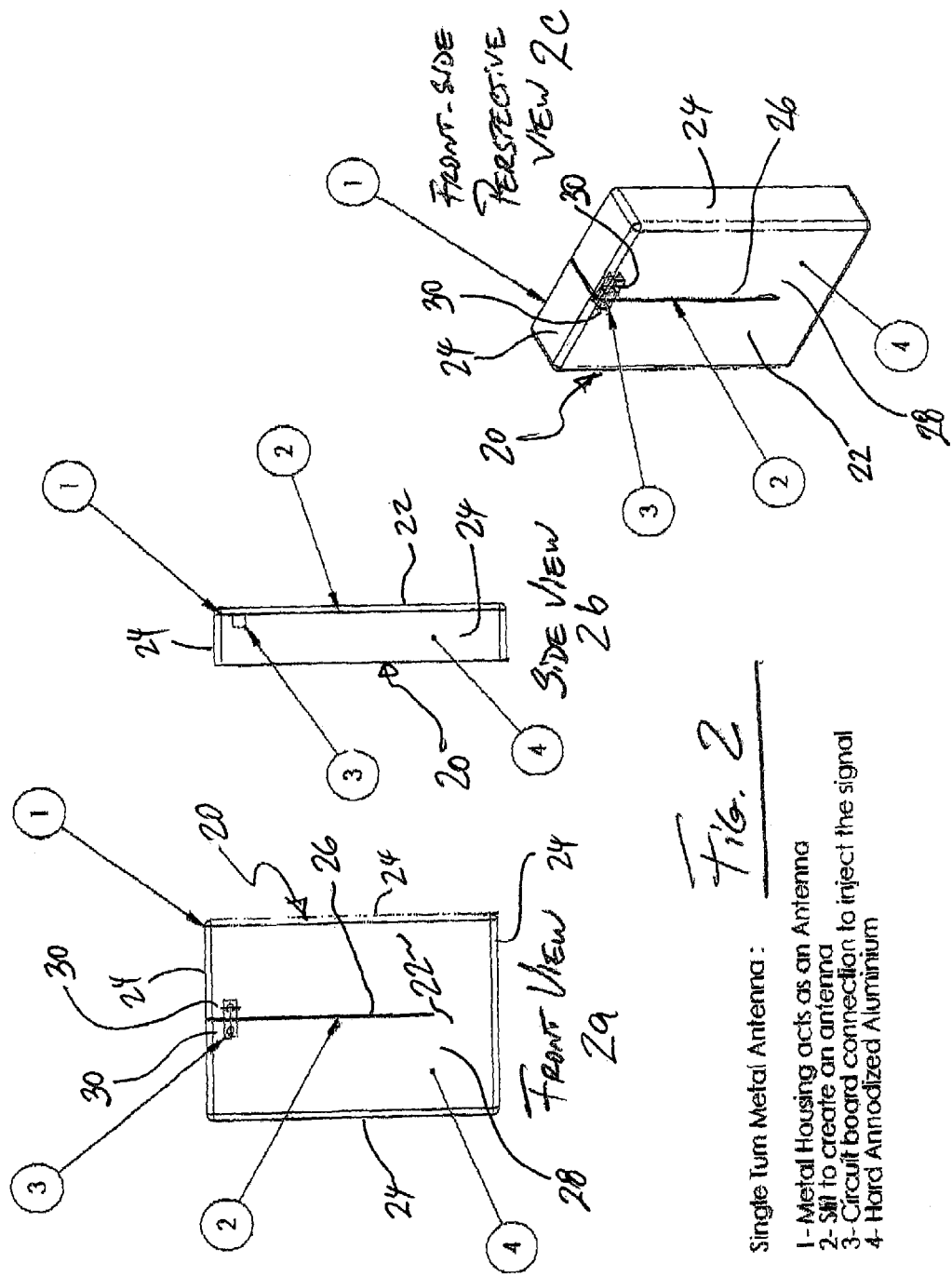

METAL HOUSING WITH INTEGRAL ANTENNA FOR RFID READER/WRITER

Priority is claimed to the Aug. 20, 2004 Filing Date of Provisional Patent Application No. 60/603,511

BACKGROUND OF THE INVENTION

1. Field of the Invention

This invention pertains to the field of radio frequency identification (RFID) readers of the type used in access control systems for reading electronically coded key tags and key cards.

2. State of the Prior Art

RFID reader/writer units may be wall mounted in access control applications where a RFID transponder tag is waved near the reader by persons requesting access. One of the key elements of an RFID (Radio Frequency Identification Device) reader/writer is the antenna. The antenna can be a metal coil or a dipole, depending on the application and other particulars of the system. Radio frequency power is provided to the antenna by appropriate electronic circuits of the reader in a modulated form (the carrier frequency), which is then radiated by the antenna to any proximate RF transponder tag. Radiated power from the transmitting antenna is absorbed by the antenna of the transponder tag where it powers up the electronic chip of the transponder. The chip of the transponder then returns a coded signal detectable by the RFID reader unit. The carrier frequency is usually used as a clock signal for the transponder chip.

The reader communicates with the transponder by modulating the carrier frequency in a patterned or coded manner (usually pulse position modulation). The transponder communicates with the reader/writer using similar methods usually encompassing loading of the carrier signal by shunting the transponder antenna to effect a corresponding variation in the reader/writer antenna. This is usually accomplished using ASK (amplitude shift key), FSK (frequency shift key), PSK (phase shift key) or various other techniques using one or more sub frequencies.

The nature of RF energy in this type of application precludes it from penetrating an electrically conductive metal housing. Therefore, most RFID reader/writer units are designed such that the antenna is covered or enclosed in a non conducting material such as polycarbonate, epoxy or ABS. While this design allows the antenna to send and receive, the relative weakness of these materials leaves the antenna (and anything packaged with it) vulnerable to vandalism and tampering. In the past, installation and maintenance of RFID reader/writers of this type in high risk areas has been problematic.

Others have constructed reader/writers that are packaged with the antenna behind a thin metal plate with one or more narrow slits or holes in a metal plate covering the front of the reader unit. The slit(s) or hole(s) allow the radio-frequency field to propagate beyond the plate from the antenna inside the reader enclosure. However, the metal plate in these designs has thickness limitations, and as a result the added protection is minimal.

An example of such prior art efforts is shown in PCT Publication WO 01/50423 A1 entitled "Electronic Key Reader". In this publication the antenna is a loop mounted behind a front metal plate of the RFID tag reader housing. One or more slots in the front metal plate allow propagation of the radio frequency field emitted by the internal antenna. However, the antenna loop is an element distinct from the metal plate or housing.

SUMMARY OF THE INVENTION

This invention addresses the problem of providing better physical protection against vandalism for RFID reader/writer units by providing the units with stronger housings made of metal rather than plastics.

This invention provides a metal plate cover or housing which also functions as the antenna element of the reader/writer. Since the antenna is also the metal plate cover or housing, which can be virtually any thickness, improved vandal/tamper resistance is achieved without blocking the RF signal. According to this invention, the antenna is integral with the metal cover or housing and not a distinct element as in the aforementioned reference.

BRIEF DESCRIPTION OF THE DRAWINGS

FIG. 2 illustrates a one piece metal housing having both a metal front and metal sides, the metal front cut with a slit to define a single turn radio frequency antenna integral with the metal housing.

DETAILED DESCRIPTION OF THE INVENTION

Figure 1:
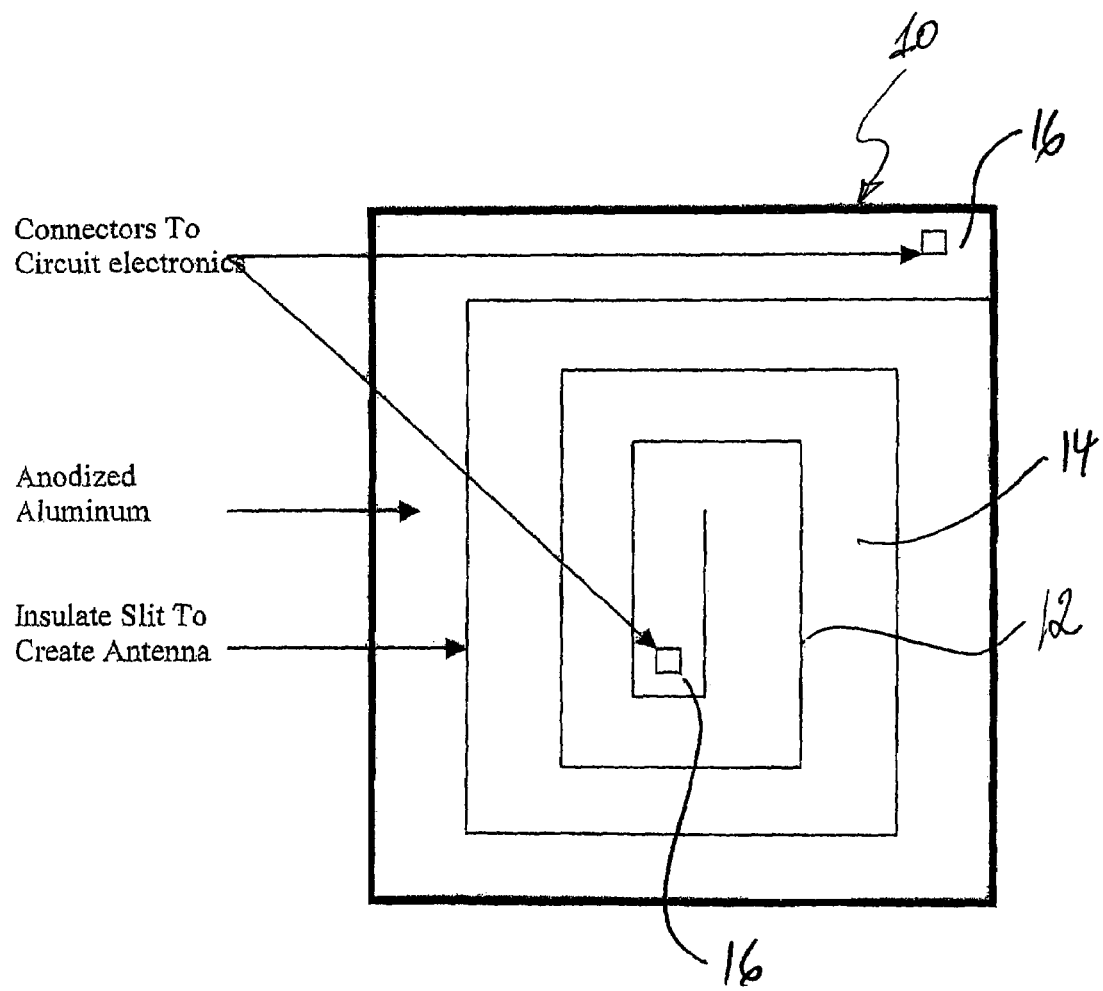
FIG. 1 shows a metal front plate for an RFID reader cut with a rectangular spiral slit to define a spiral antenna integral with the metal plate.

An embodiment of the present invention is illustrated in accompanying FIG. 1, where a metal plate 10 is cut with a rectangular spiral slit 12 to define a spiral antenna 14 integral with the metal plate 10. The plate 10 may be of aluminum, anodized to provide electrical insulation on the aluminum surface. The insulation prevents contact and shorting between adjacent turns of the spiral antenna 14 and also protects users against possible electrical shock in the event of a circuit malfunction of the RFID reader/writer circuits. As indicated in the drawing the opposite ends 16 of the spiral antenna are connected to appropriate points of the RFID reader/writer electronic circuits such that radio frequency energy is delivered to the antenna 14 and radiated therefrom. The metal plate provides an exterior cover, such as a front cover plate, for the circuits of a RFID reader installed in a wall or other protective structure which completes an enclosure with the metal plate 10.

FIG. 2 of the accompanying drawings illustrates another embodiment of the invention where a metal housing 20 having both a metal front 22 and metal sides 24 is cut with a slit 26 to define a single turn radio frequency antenna 28 integral with the housing 20. Appropriate points of the integrated housing/antenna 20, 28, such as the opposite ends 30 of the single turn antenna, are electrically connected to the radio frequency output of the reader/writer circuits for injecting the antenna with RF power. The metal front 22 and metal sides 24 of the housing of FIG. 2 may be formed as single metal piece for greater strength. An appropriate housing back, which may also be of metal, is provided where needed. The metal housing of FIG. 2 is suitable for RFID reader installations where the reader is free standing or is mounted to a wall surface, for example, so that the reader is not otherwise surrounded by protective structure. In such installations the metal housing may fully enclose and protect the circuits and other components of the reader unit.

In both embodiments of FIGS. 1 and 2 the antenna and the metal housing 20 or front plate 10 are a single integrated element which can be made of any suitable thickness to provide a desired degree of physical protection against vandalism of both the antenna and any RFID reader/writer circuits and components housed behind the metal plate 10 or in the metal housing 20.

While particular embodiments of the invention have been described and illustrated for purposes of clarity and example, it will be understood that many changes, substitutions and modifications will be apparent to those having only ordinary skill in the art without thereby departing from the scope of the invention as defined by the following claims.

The invention claimed is:

1. A radio frequency identification tag reader including radio frequency transmitter and receiver circuits, said circuits having at least one radio frequency output, said tag reader having a front, a metal plate covering said front and one side of said metal plate being exterior to said tag reader, said metal plate being cut to define one or more antenna loops integral with said plate and having points thereon electrically connected to said at least one radio frequency output for radiating radio frequency energy by said antenna loops, said metal plate also providing an exterior front cover of an enclosure for said circuits.

2. The reader of claim 1 wherein said enclosure comprises wall structure partially enclosing said tag reader.

3. The reader of claims 1 wherein said metal plate is relatively thick for resisting damage by vandalism when installed in a public location.

4. The reader of claim 1 wherein said antenna is defined by a single cut in said metal plate.

5. The reader of claim 1 wherein said antenna is a spiral antenna.

6. The reader of claim 1 wherein said antenna is a single turn antenna.

7. The reader of claim 1 wherein said metal plate is part of a reader housing for said circuits.

8. The reader of claim 7 wherein said reader housing has a housing front and housing walls forming a single piece metal housing.

9. The reader of claim 1 wherein said metal plate is at least partially covered with an electrically insulating material.

10. A radio frequency identification tag reader having radio frequency circuits with at least one radio frequency output and a reader housing, said housing including a housing front and a plurality of housing walls, said housing front and said housing walls forming a one piece housing, an exterior metal plate of said housing being cut to define one or more antenna loops integral with said housing and having points thereon electrically connected to said at least one radio frequency output of said circuits for radiating radio frequency energy by said antenna loops.

* * * * *